United States Patent
Junnarkar et al.

(10) Patent No.: US 7,317,517 B2
(45) Date of Patent: Jan. 8, 2008

(54) BIREFRINGENCE PROFILER

(75) Inventors: Mahesh R. Junnarkar, San Jose, CA (US); Bidhan P. Chaudhuri, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 431 days.

(21) Appl. No.: 10/631,538

(22) Filed: Jul. 31, 2003

(65) Prior Publication Data

US 2005/0024627 A1 Feb. 3, 2005

(51) Int. Cl.
*G01N 21/00* (2006.01)

(52) U.S. Cl. .................................... 356/73.1

(58) Field of Classification Search ...... None
See application file for complete search history.

(56) References Cited

U.S. PATENT DOCUMENTS 6,678,433 B2* 1/2004 Kim et al. .................. 385/15
6,856,391 B2* 2/2005 Garab et al. ................ 356/366
6,856,710 B2* 2/2005 Wein et al. .................. 385/11
2003/0081196 A1* 5/2003 Geiler et al. ................. 356/33

FOREIGN PATENT DOCUMENTS

JP 2000-329651 * 11/2000

* cited by examiner

*Primary Examiner*—Tu T Nguyen
(74) *Attorney, Agent, or Firm*—Trop, Pruner & Hu, P.C.

(57) ABSTRACT

A waveguide under test can be exposed to a light signal whose polarization rotates between the vertical and horizontal polarizations. The intensity detected at a photodetector can be separated into AC and DC components. The AC components may be utilized to derive a characteristics which is indicative of birefringence of the waveguide. If the light signal is scanned over the waveguide under test, a measure of the birefringence at each position along the waveguide may be determined.

19 Claims, 2 Drawing Sheets

BIREFRINGENCE PROFILER

BACKGROUND

This invention relates generally to monitoring waveguide birefringence.

Birefringence is the difference in refractive indexes along the X and Y axes of a waveguide. In order to characterize a waveguide, such as a planar waveguide, it is desirable to know its birefringence. Currently there is no test equipment known to the inventors that can directly monitor waveguide birefringence.

Birefringence, for example, causes polarization-mode dispersion. Polarization-mode dispersion is pulse spreading caused by a change of waveguide polarization properties. This is a random dispersion that is difficult to compensate for. In order to describe the polarization-mode dispersion, it is necessary to determine the birefringence.

Generally, any type of unintended dispersion is undesirable since it changes the characteristics of a light pulse. Thus, to some degree, it is desirable to either avoid or compensate for such dispersion. In the case of polarization-mode dispersion, in order to compensate or avoid the dispersion, it is first desirable to characterize that dispersion.

A birefringence contribution may add to polarization dependent loss (PDL) in planar light wave circuits based on optical interference. This may become an issue, for example, in arrayed waveguides and Mach-Zehnder interferometers.

Thus, there is a need for a way to directly characterize the birefringence of a waveguide.

DETAILED DESCRIPTION

Figure 1:
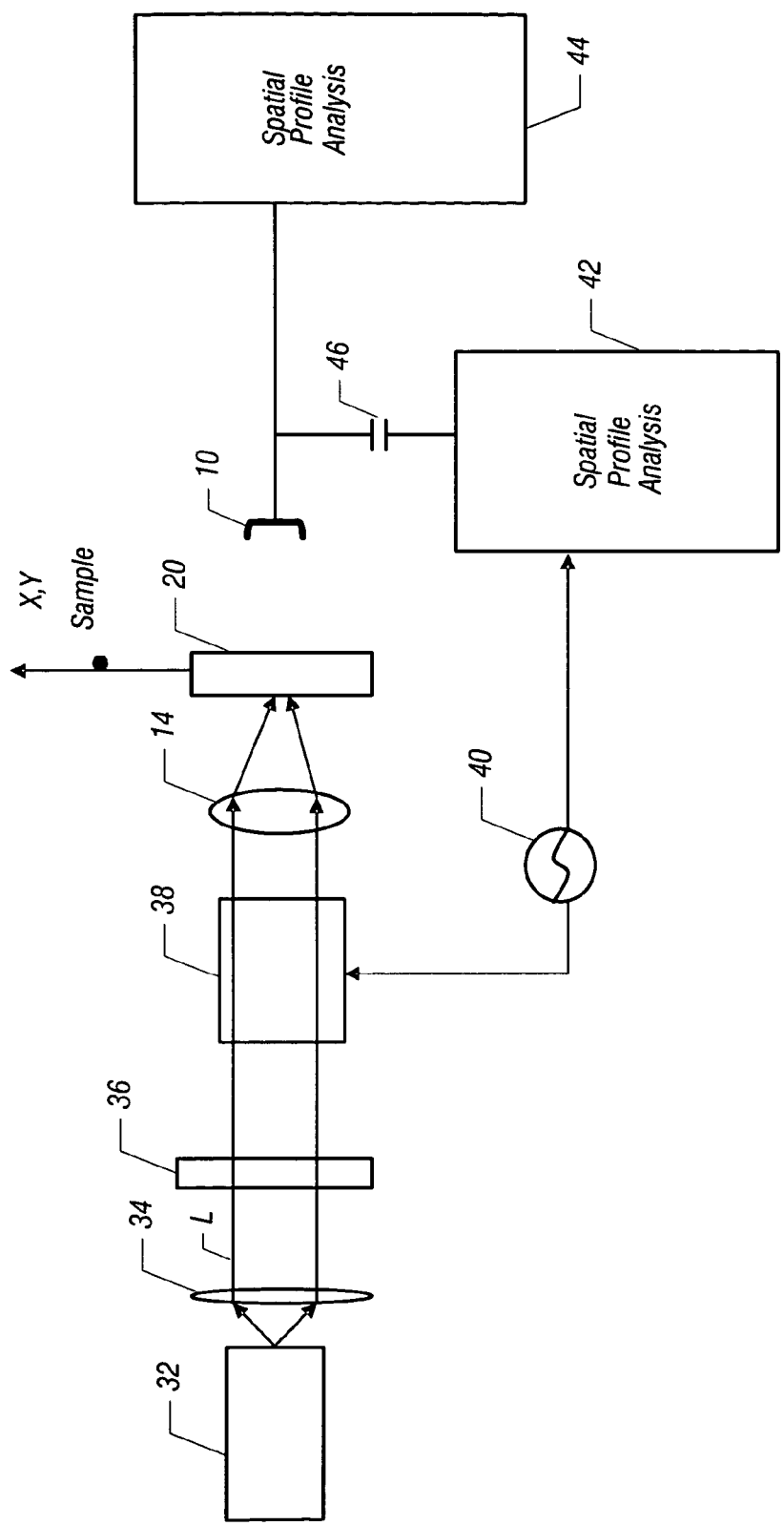
FIG. 1 is a schematic depiction of one embodiment of the present invention.

Referring to FIG. 1, a laser diode 32 may generate a laser beam "L." In one embodiment, the laser beam L may have a wavelength of 1550 nanometers. The beam L is passed through a polarizer 36. The polarizer 36 extracts one fixed polarization, either the vertical or horizontal polarization. The fixed polarization is passed to an electrooptic modulator $\pi$ phase 38, for example at one megahertz. The electrooptic modulator 38 may be an electrooptic crystal in one embodiment.

The modulator 38 continuously rotates the fixed polarization it receives from the polarizer 36 between the vertical and horizontal polarizations under control of the voltage from the generator 40. The rate at which the polarization is rotated is determined by the frequency of the driver 40, which in one embodiment may be 1 megaHertz. The light beam L, with its polarization rotating continuously, is then passed through a high numerical aperture lens 14 before exposing the refractive index profiler 20.

The refractive index profiler 20 operates, in one embodiment, using a refracted near-field approach. The device 20 may be utilized to enable planar lightwave circuit designers to accurately control and optimize such devices, as one example. The device 20 is commercially available from EXFO in Vanier, Canada GIM 3G7.

Figure 2:
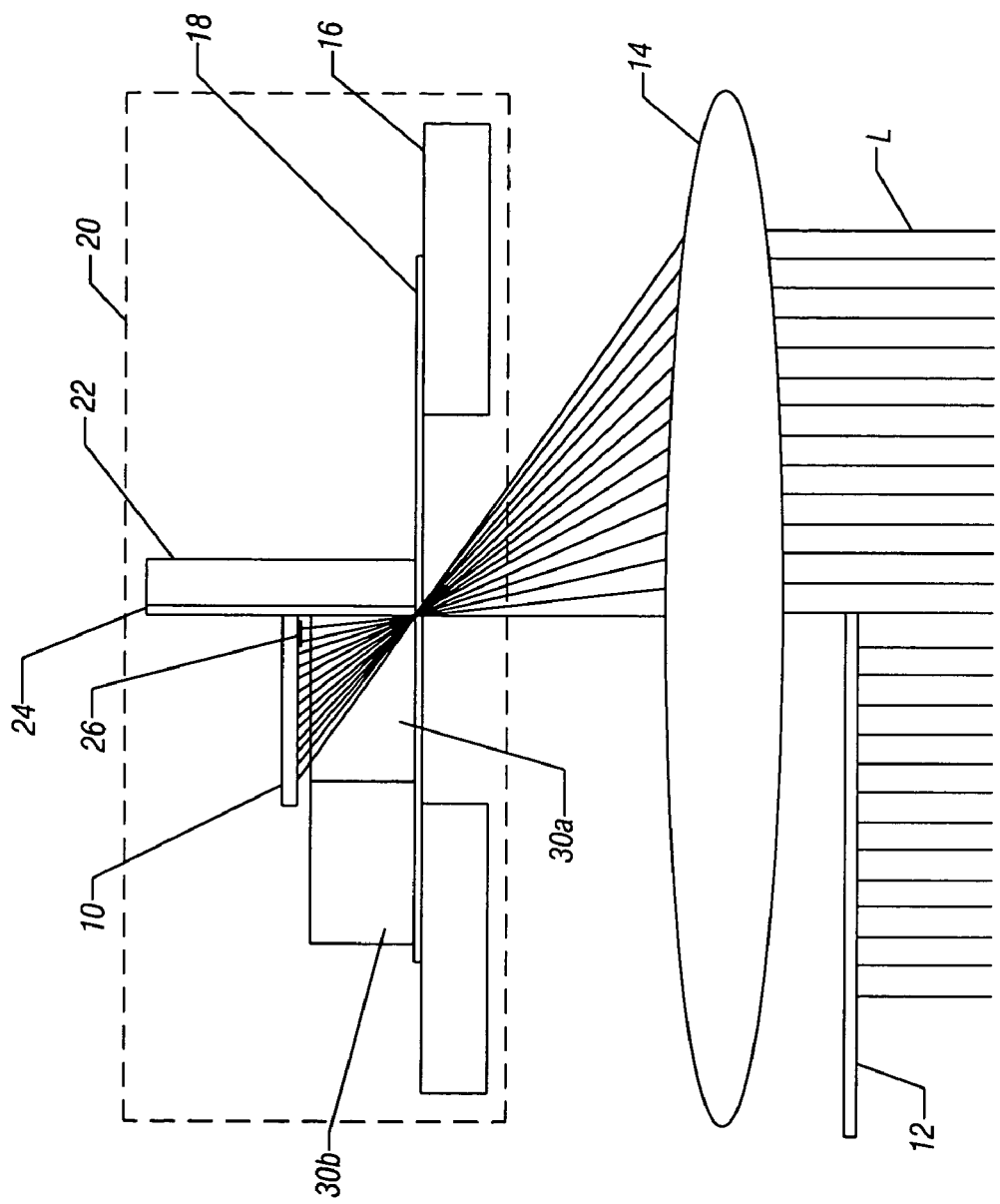
FIG. 2 is a schematic depiction of the device 20 shown in FIG. 1 for measuring refractive index profile.

Referring to FIG. 2, the refractive index profiler 20 is shown in more detail. A sectorial stop 12 may be utilized to stop a portion of the laser beam L as indicated. The high numerical aperture lens 14 focuses the rotating polarization, collimated light beam on the end face 24 of a waveguide 22 under test. The lens 14 may be an immersion objective lens in one embodiment. The waveguide under test 22 may be placed vertically in the test cell.

The test cell may include a diopter 18 supported on positioning stages 16. Reference blocks 30a and 30b may be positioned over the diopter 18 on one side thereof. A photodetector 10 may be positioned along side of the waveguide under test end face 24 at substantially right angles thereto. A leaky mode cache 26 may be positioned under the detector 28 adjacent the end face 24.

The test cell may be scanned in steps in the X and Y directions across the laser beam L, focused by the high numerical aperture lens 14. For example, 0.1 micro scan steps may be used. The Z direction allows the laser beam L to be focused accurately on the waveguide under test end face 24. The photodetector 10, placed above the sample end face 24, collects a portion of the beam refracted out of the waveguide 22 under test.

The detected signal is inversely proportional to the changes in the index of refraction encountered at the waveguide under test end face 24 during a scan across the focus of the beam L. From the known refractive index values of the two reference blocks 30a and 30b, a linear interpolation in the module 42 provides a sample refractive index profile.

In one embodiment, the electrooptic modulator 38, working at 1 to 10 megaHertz, introduces TE/TM polarization alternately into the waveguide 22 under test. The waveguide 22 under test stress birefringence introduces light intensity modulation at the photodetector 10 at 1 to 10 megaHertz.

An AC signal at 1 to 10 megahertz, for example, corresponds to the difference between the intensity detected by the photodiode 10 at each polarization. The capacitor 46 isolates the modulator 42 and receives the AC component at each X,Y point on the waveguide 22 from the photodetector 10. The photodetector 10, in one embodiment, may have a response time that is the inverse of 10 megahertz and may have an impedance of 1-2 megaohms in one embodiment. The difference signal can be scaled to a DC signal, which is inversely proportional to the refractive index of the waveguide 22 under test and may be analyzed by the module 44. Since the waveguide 22 under test is translated in the X and Y directions, the birefringence profile at each position in the X,Y plane of the waveguide 22 under test can be obtained with submicron accuracy spatial resolution in some embodiments.

The spatial profile analysis device 44 provides the refractive index profile from the DC signal from the photodetector 10. The spatial profile analysis module 42 receives a synchronization signal from the generator 40 and develops a birefringence profile using the AC information from the photodiode 10. The synchronization signal syncs the module 42 to the polarization rotation supplied by the modulator 38.

AC measurements at 1 megahertz lock-in can pick up relatively minute difference signals in two polarizations at each spatial position. Those signals can be calibrated against a DC refractive index, resulting in a birefringence measurement that, in some embodiments, is better than $10^{-3}$, which is the average refractive index measurement.

In one embodiment, the lens 14 may match the resolution of the profiler 20, which may be approximately 0.2 microns in one embodiment.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   generating a light signal rotating between two polarization states;
   exposing a waveguide under test to said light signal;
   measuring the intensity of the light signal from the exposed waveguide at both polarization states; and
   deriving a characteristic indicative of birefringence of the waveguide using the measured intensity of both projection states.

2. The method of claim 1 wherein generating a light signal includes producing a laser beam, polarizing said laser beam, and rotating the polarization of said polarized laser beam.

3. The method of claim 2 including using an electrooptic modulator to rotate the polarization of said light signal.

4. The method of claim 1 wherein exposing the waveguide under test includes scanning the waveguide under test in two dimensions.

5. The method of claim 4 including determining the characteristic indicative of birefringence at a plurality of positions in two dimensions.

6. The method of claim 4 including obtaining a measure of the difference in refractive indexing in two dimensions to obtain said indication of birefringence.

7. The method of claim 1 including profiling the refractive index of the waveguide.

8. The method of claim 7 including using a photodetector to detect light from said laser beam refracted by said waveguide.

9. The method of claim 8 including using normalized data from said photodetector to determine the refractive index profile.

10. The method of claim 7 including analyzing an AC signal from said photodetector to determine the birefringence of said waveguide.

11. The method of claim 7 including obtaining the birefringence from an AC signal from said photodetector and obtaining the refractive index profile from a DC signal from said photodetector.

12. A birefringence profiler comprising:
    a source of laser light at continuously rotating polarization states; and
    a photodetector to expose a waveguide under test to said light signal;
    measure the intensity of the light signal from the exposed waveguide at both polarization states; and
    derive a characteristic indicative of birefringence of the waveguide using the measured intensity of both projection states.

13. The profiler of claim 12 wherein said light source includes a laser beam, a polarizer to extract a fixed polarization, and an electrooptic modulator to continuously rotate the polarization states.

14. The profiler of claim 13 including a module to extract an alternating current component from a signal from the photodetector.

15. The profiler of claim 14 wherein said module is synchronized to the frequency of polarization rotation.

16. The profiler of claim 15 including a signal generator that generates a signal that controls the frequency of polarization rotation of said modulator and is also provided to said module.

17. A birefringence profiler comprising:
    a source of laser light at continuously rotating polarization states; and
    a photodetector to detect the difference in intensity of a light signal from a waveguide under test at the two different polarization states, including a module that extracts an alternating current component from a signal from the photodetector.

18. The profiler of claim 17 wherein said module is synchronized to the frequency of polarization rotation.

19. The profiler of claim 17 including an electrooptic modulator and a signal generator that generates a signal that controls the frequency of polarization rotation of said modulator and is also provided to said module.

* * * * *